United States Patent
Shimura et al.

(10) Patent No.: US 10,027,837 B2
(45) Date of Patent: Jul. 17, 2018

(54) CALCULATION APPARATUS AND IMAGE FORMING APPARATUS INCLUDING THE SAME

(71) Applicant: CANON KABUSHIKI KAISHA, Tokyo (JP)

(72) Inventors: Yasuhiro Shimura, Yokohama (JP); Tatsuya Hotogi, Susono (JP); Yuki Nakajima, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/335,280

(22) Filed: Oct. 26, 2016

(65) Prior Publication Data

US 2017/0126918 A1 May 4, 2017

(30) Foreign Application Priority Data

Oct. 30, 2015 (JP) .................. 2015-214975

(51) Int. Cl.
*G03G 15/20* (2006.01)
*H04N 1/00* (2006.01)
*G03G 15/00* (2006.01)

(52) U.S. Cl.
CPC ..... *H04N 1/00899* (2013.01); *G03G 15/2039* (2013.01); *G03G 15/80* (2013.01); *H04N 1/00058* (2013.01); *H04N 1/00068* (2013.01); *G03G 2215/2035* (2013.01); *H04N 2201/0094* (2013.01)

(58) Field of Classification Search
CPC ............. G03G 15/80; G03G 15/2039; G03G 2215/2035; H04N 1/00058; H04N 1/00068; H04N 1/00899; H04N 2201/0094

USPC .............................................. 399/37, 69, 88
See application file for complete search history.

(56) References Cited

U.S. PATENT DOCUMENTS

| 7,379,685 | B2 | 5/2008 | Tatematsu | |
|---|---|---|---|---|
| 2011/0217062 | A1* | 9/2011 | Chosokabe | G03G 15/80 399/69 |
| 2012/0148273 | A1* | 6/2012 | Shimura | G03G 15/2039 399/33 |
| 2012/0263486 | A1* | 10/2012 | Aiko | G03G 15/2039 399/67 |
| 2013/0272738 | A1* | 10/2013 | Kawakami | G03G 15/2039 399/69 |
| 2014/0035367 | A1* | 2/2014 | Kohri | H02J 4/00 307/29 |
| 2015/0253705 | A1* | 9/2015 | Shimura | G03G 15/2039 399/33 |

FOREIGN PATENT DOCUMENTS

JP 2007-212503 A 8/2007

* cited by examiner

*Primary Examiner* — Sophia S Chen
(74) *Attorney, Agent, or Firm* — Canon U.S.A., Inc. IP Division

(57) ABSTRACT

An apparatus includes a calculation unit configured to calculate information about power using a first signal and a second signal, a first communication unit configured to transmit a calculation result of the calculation unit, and a second communication unit configured to receive a plurality of pieces of setting information stored in a storage unit, wherein the calculation apparatus is capable of switching calculation processing of the calculation unit based on the plurality of pieces of setting information received via the second communication unit.

12 Claims, 6 Drawing Sheets

CALCULATION APPARATUS AND IMAGE FORMING APPARATUS INCLUDING THE SAME

BACKGROUND OF THE INVENTION

Field of the Invention

An aspect of the embodiments relates to a calculation apparatus for calculating power to be supplied to an image forming apparatus, such as a copying machine, a printer, and a facsimile.

Description of the Related Art

An image forming apparatus includes a fixing apparatus (also referred to as an image heating apparatus) that heats a recording material on which an image is transferred so as to fix the image onto the recording material. The image forming apparatus is provided with a calculation apparatus (calculation circuit) for calculating a power value, an effective current value, and an effective voltage value which are to be supplied to the image heating apparatus in order for control of the operation of the image heating apparatus. For example, Japanese Patent Application Laid-Open No. 2007-212503 discusses an example of a calculation apparatus.

In such a calculation apparatus, if calculation functions are diversified for improvement in flexibility, the circuit scale increases whereby the circuit scale and the manufacturing cost are increased.

SUMMARY OF THE INVENTION

According to an aspect of the embodiments, an apparatus includes a calculation unit configured to calculate information about power using a first signal related to a current and a second signal related to a voltage, a first communication unit configured to transmit a calculation result of the calculation unit, a second communication unit configured to receive a plurality of pieces of setting information stored in a storage unit, and a switching unit configured to switch calculation processing of the calculation unit, based on the plurality of pieces of the setting information.

According to another aspect of the embodiments, a fixing apparatus for fixing an image on a recording material includes a heater configured to heat the recording material on which the image is formed, a calculation unit configured to calculate information about power using a first signal related to a current and a second signal related to a voltage, a first communication unit configured to transmit a calculation result of the calculation unit, a second communication unit configured to receive a plurality of pieces of setting information stored in a storage unit, a switching unit configured to switch calculation processing of the calculation unit, based on the plurality of pieces the setting information, and a control unit configured to control power to be supplied to the heater according to information transmitted from the first communication unit.

According to yet another aspect of the embodiments, an image forming apparatus includes an image forming unit configured to form an image on a recording material, a heater configured to heat a recording material on which an image is formed, a calculation unit configured to calculate information about power using a first signal related to a current and a second signal related to a voltage, a first communication unit configured to transmit a calculation result of the calculation unit, a second communication unit configured to receive a plurality of pieces of setting information stored in a storage unit, a switching unit configured to switch calculation processing of the calculation unit, based on the plurality of pieces of the setting information, and a control unit configured to control power to be supplied to the heater according to information transmitted from the first communication unit.

Further features of aspects of the embodiment will become apparent from the following description of exemplary embodiments with reference to the attached drawings.

DESCRIPTION OF THE EMBODIMENTS

Exemplary embodiments according to technical concepts of the present invention will be described below with reference to the accompanying drawings.

Figure 1A:
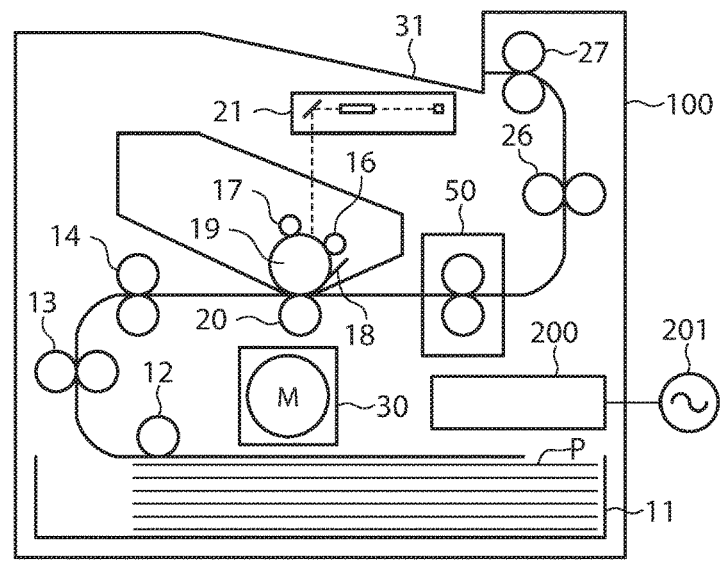
FIG. 1A is a sectional view illustrating an image heating apparatus according to an aspect of the embodiments.
Figure 1B:
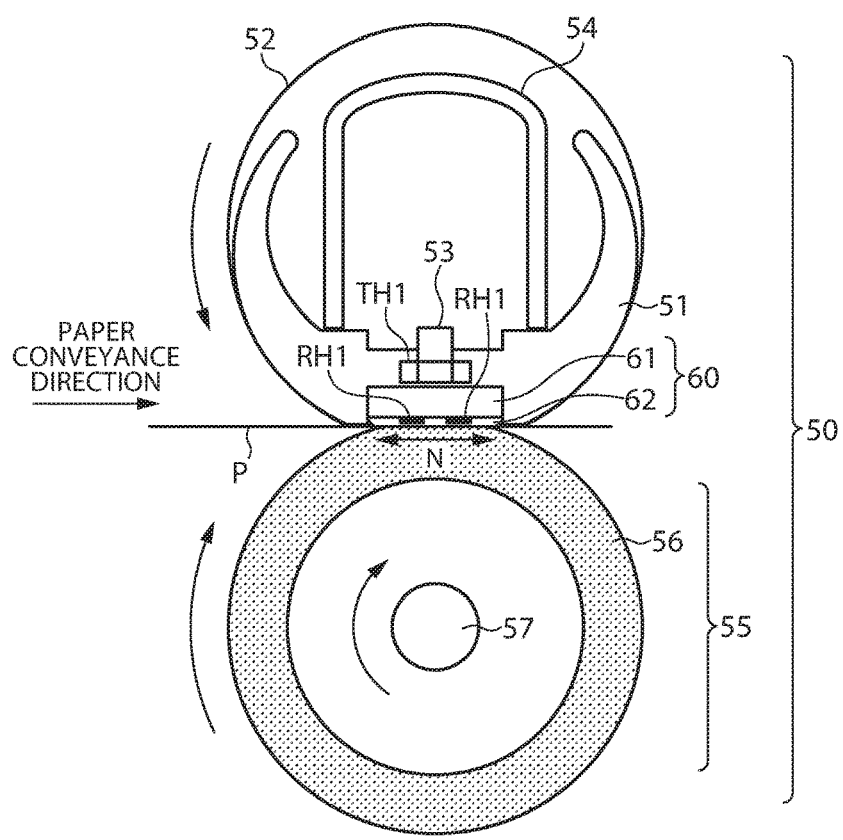
FIG. 1B is a sectional view illustrating an image forming apparatus according to the aspect of the embodiments.

A first exemplary embodiment will be described below. As examples to which the present exemplary embodiment is applicable, FIG. 1A illustrates an electrophotographic image forming apparatus 100, and FIG. 1B illustrates an image heating apparatus 50. FIG. 1A is a sectional view illustrating the image forming apparatus 100 which is a laser beam printer employing the electrophotographic method. When a print signal is generated, a scanner unit 21 emits laser light modulated according to image information, and the laser light scans a photosensitive member 19 charged to a predetermined polarity by a charging roller 16. Thus, an electrostatic latent image is formed on the photosensitive member 19. Then, toner is supplied from a developing unit 17 to the electrostatic latent image, and a toner image according to the image information is formed on the photosensitive member 19. Meanwhile, recording materials (also referred to as recording sheets) P stacked in a sheet supplying cassette 11 are picked up one by one by a pickup roller 12 and then conveyed to a registration roller 14 by a roller 13. In synchronization with timing of when the toner image formed on the photosensitive member 19 reaches a transfer position which is formed between the photosensitive member 19 and a transfer roller 20, a recording material P is conveyed from the registration roller 14 to the transfer position. The toner image on the photosensitive member 19 is transferred onto the recording material P while the recording material P is passing through the transfer position. Then, the recording material P is heated by the image heating apparatus 50 and the toner image is fixed onto the recording material P. The recording material P with the fixed toner image borne thereon is discharged onto a discharge tray 31 at the upper part of the image forming apparatus 100 by roller pairs 26 and 27. A cleaner 18 cleans the photosensitive member 19, and a motor 30 drives the image heating apparatus 50 and others. The above-described photosensitive member 19, the charging roller 16, the scanner unit 21, the developing unit 17, and the transfer roller 20 are included in an image forming unit for forming an image (unfixed image) on the recording material P. A power supply apparatus 200 connected with an alternating-current (AC) power source 201 is a power supply apparatus for supplying power to the image forming apparatus 100 and the image heating apparatus 50.

FIG. 1B is a sectional view illustrating the image heating apparatus (also referred to as a fixing apparatus) 50. The image heating apparatus 50 includes a cylindrical film 52 (an endless film in the present exemplary embodiment), a heater 60 in contact with the inner surface of the film 52, and a pressure roller 55 (pressing member) for forming a fixing nip portion N with the heater 60 via the film 52. The film 52 and the pressure roller 55 are nip portion forming members for forming the fixing nip portion N. The material of the base layer of the film 52 is heat-resistant resin, such as polyimide, or a metal, such as stainless steel. The pressure roller 55 includes a metal core 57 made of material, such as iron and aluminum, and an elastic layer 56 made of material, such as silicone rubber. The heater 60 is supported by a holding member 51 made of heat-resistant resin. The holding member 51 also functions as a guide for guiding the rotation of the film 52. The pressure roller 55 receives a driving force from the motor 30 and rotates in a direction indicated by an arrow illustrated in FIG. 1B. The rotation of the pressure roller 55 rotatably drives the film 52. The heater 60 includes a ceramic heater substrate 61 and heat generating resistors RH1 disposed on the heater substrate 61 along the longitudinal direction thereof (the two heat generating resistors RH1 are connected in series on the heater substrate 61). The heater 60 further includes an insulating surface protection layer 62 for covering the heat generating resistors RH1 (glass is applied to ensure insulation in the present exemplary embodiment). A thermistor TH1 as a temperature detection element contacts a paper passing area of the image forming apparatus 100 on a back side of the heater substrate 61. The recording material P with an unfixed toner image borne thereon is subjected to fixing processing in such a manner that the recording material is heated, while being pinched and conveyed by the fixing nip portion N. A protection element 53, such as a thermal switch or a thermal fuse, also contacts a back side of the heater substrate 61. If an abnormal temperature rise occurs, the protection element 53 operates to interrupt the power supply line to the heating area. A metal stay 54 applies pressure of a spring (not illustrated) to the holding member 51.

Figure 2:
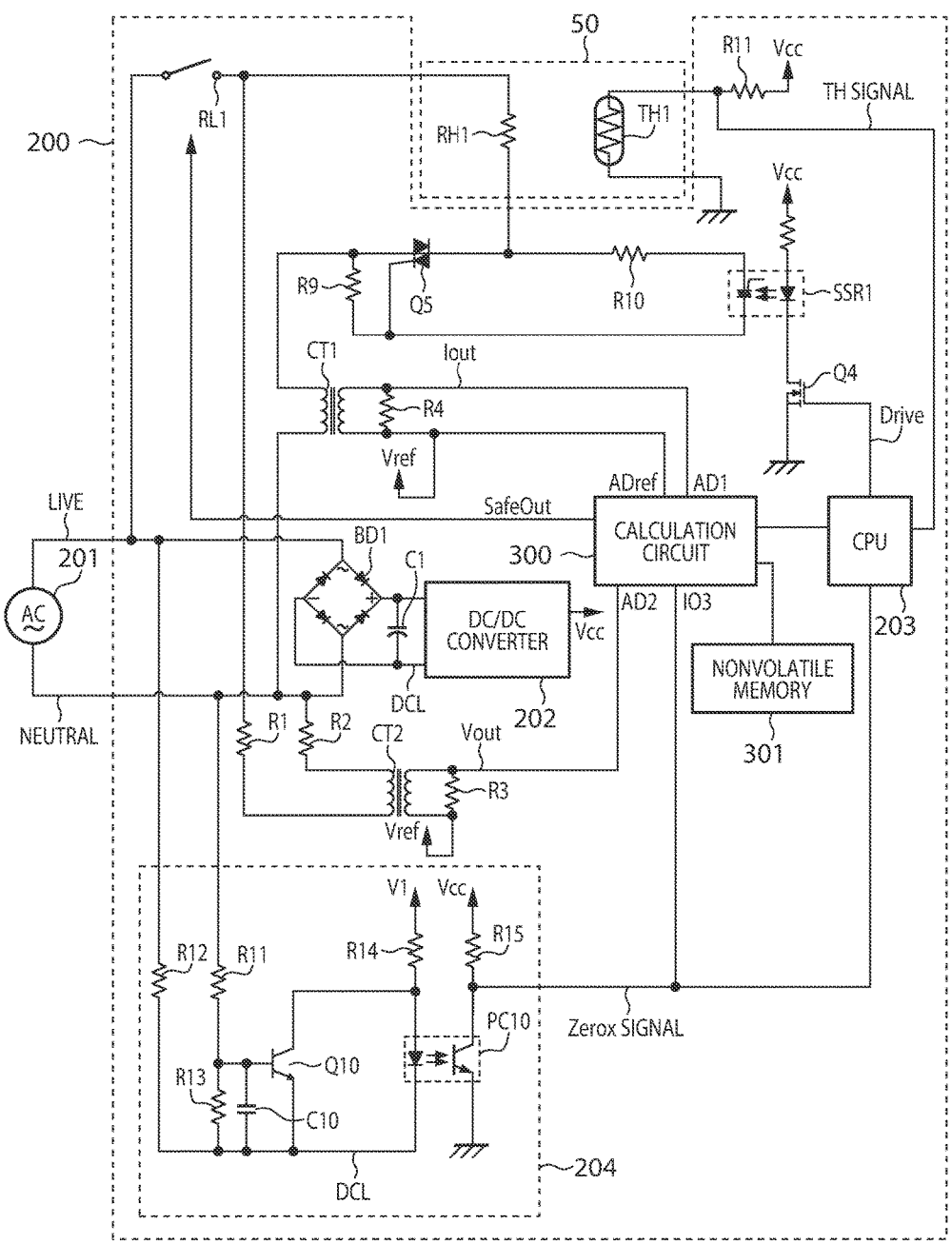
FIG. 2 is a diagram illustrating a power supply apparatus according to an aspect of a first exemplary embodiment.

FIG. 2 illustrates a configuration of the power supply apparatus 200 as an example of an apparatus that can be provided with a calculation circuit 300 which characterizes the present exemplary embodiment. The power supply apparatus 200 includes a transformer CT2 for detecting a voltage supplied from the AC power source 201 to the image heating apparatus 50, and a transformer CT1 for detecting a current supplied to the image heating apparatus 50. Referring to FIG. 2, a central processing unit (CPU) 203 is an operation control unit used as a control unit of the image heating apparatus 50 and the image forming apparatus 100. A method for controlling power to the image heating apparatus 50 by the CPU 203 will be described below.

As a method for controlling power to the image heating apparatus 50, the CPU 203 controls the power supply to the heat generating resistors RH1 through an ON/OFF operation of a triac Q5. Resistive elements (hereinafter referred to as resistors) R9 and R10 are resistors for driving the triac Q5. A photo-triac coupler SSR1 is an element for transmitting a signal in a state where a creeping distance between the primary and the secondary sides of the power source is maintained. When power is supplied to the secondary side light emitting diode of the photo-triac coupler SSR1, the primary side triac of the photo-triac coupler SSR1 turns ON. Then, the triac Q5 turns ON and remains in the ON state until arcs are extinguished at a zero-crossing timing of the AC power source 201. The secondary side light emitting diode of the photo-triac coupler SSR1 is turned ON and OFF by a transistor Q4. The transistor Q4 operates according to a drive signal from the CPU 203. The temperature, of the heater 60 of the image heating apparatus 50, which is detected by the thermistor TH1 is controlled in such a manner that the CPU 203 detects a divided voltage between the thermistor TH1 and a resistor R11 as a TH signal. In the internal processing of the CPU 203, the CPU 203 calculates, for example, through Proportional-Integral (PI) control, the power duty based on the temperature detected by the thermistor TH1 and the temperature setting of the heater 60 of the image heating apparatus 50. The CPU 203 converts the power duty into a control level, such as the phase angle (phase control) and the wavenumber (wavenumber control) corresponding to the power duty (electric energy) to be supplied, and controls the ON/OFF state of the triac Q5 based on the control condition. Examples of known methods of controlling power to be supplied include phase control for controlling a phase angle of half-waves of an AC voltage, wavenumber control for controlling the number of half-waves of an AC voltage, and hybrid control which combines the phase control and the wavenumber control.

A direct-current (DC)/DC converter 202 is an insulated converter which is used for supplying a power voltage to the image forming apparatus 100. The AC voltage supplied from the AC power source 201 is full-wave rectified by a bridge diode BD1 and then smoothed by a capacitor C1. The DC/DC converter 202 outputs a power voltage Vcc to the secondary side based on the primary side voltage charged in the capacitor C1. The voltage output from the auxiliary winding of a transformer (not illustrated) of the DC/DC converter 202 is smoothed thereby to form a power voltage V1 and the power voltage V1 is used by the primary side circuit. A potential DCL is a potential, on the lower side, smoothed by the capacitor C1.

A zero-crossing detection circuit 204 will be described below. When a potential, of the neutral line, supplied from the AC power source 201 is higher than a potential of the live line, a current flows in the zero-crossing detection circuit 204 via the resistor R11. When a current supplied from the resistor R11 flows into a base terminal of a transistor Q10 of the zero-crossing detection circuit 204, the transistor Q10 turns ON. A resistor R13 and a capacitor C10 are used for adjusting operation timing of the transistor Q10. When the transistor Q10 turns ON, the voltage applied to the primary side diode of a photocoupler PC10 drops, and the secondary side transistor of the photocoupler PC10 turns OFF. When the secondary side transistor of the photocoupler PC10 turns OFF, a voltage of the Zerox signal rises since it is pulled up to the power voltage Vcc via a resistor R15. Then, the CPU 203 detects a High state of the Zerox signal. When the potential of the neutral line is lower than the potential of the live line, a current flows in the zero-crossing detection circuit 204 via a resistor R12, and the transistor Q10 turns OFF. When the transistor Q10 turns OFF, a current flows from the power voltage V1 into the primary side diode of the photocoupler PC10 via a pull-up resistor R14, and the secondary side transistor of the photocoupler PC10 turns ON. When the secondary side transistor of the photocoupler PC10 turns ON, the voltage of the Zerox signal drops. Then, the CPU 203 detects a Low state of the Zerox signal. Based on the Zerox signal output from the zero-crossing detection circuit 204, the CPU 203 detects the zero-crossing timing of the AC power source 201 and a period of the AC power source 201 which are used for control of the image heating apparatus 50. Likewise, the calculation circuit 300 also detects the Zerox signal with an IO3 terminal which is an input/output (IO) port for input and detects the zero-crossing timing of the AC voltage and the period of the AC voltage input from the AC power source 201.

The following describes a method for detecting the current supplied to the image heating apparatus 50 using the transformer CT1. When the current to be supplied to the image heating apparatus 50 flows into the primary side of the transformer CT1, a current proportional to the primary side current flows whereby a voltage Iout is generated in a damping resistor R4 on the secondary side of the transformer CT1. The voltage Iout and a predetermined reference voltage Vref are then input to the calculation circuit 300. The calculation circuit 300 detects a current value flowing in the image heating apparatus 50 based on a difference value between the output Iout of the transformer CT1 and the reference voltage Vref.

The following describes a method for detecting the AC voltage supplied from the AC power source 201 by using the transformer CT2. A current proportional to the series resistance value (predetermined fixed value) of resistors R1 and R2 as voltage/current conversion elements and the voltage value from the AC power source 201 flows into the primary side of the transformer CT2. A current proportional to the primary side current flows whereby a voltage Vout is generated in a damping resistor R3 on the secondary side of the transformer CT2. The voltage Vout and the predetermined reference voltage Vref are then input to the calculation circuit 300. The calculation circuit 300 detects the voltage of the AC power source 201 based on a difference value between the output Vout of the transformer CT2 and the reference voltage Vref.

The following describes details of the calculation circuit 300 as a calculation apparatus. The calculation circuit 300 detects two input signals Iout and Vout by inputting them to analog-to-digital (AD) converters AD1 and AD2. Another AD converter ADref is used for detecting the reference voltage Vref. A SafeOut terminal serves as a terminal for outputting a signal from the calculation circuit 300 and is used for instructing the turn ON or OFF operation of the power supply to the image heating apparatus 50. The calculation circuit 300 includes two communication units (a first communication unit and a second communication unit) to be described below with reference to FIG. 3. The second communication unit communicates with a nonvolatile memory 301, and the first communication unit communicates with the CPU 203. The nonvolatile memory 301 stores setting values, for the calculation circuit 300, which are optimized for the power supply apparatus 200. The calculation circuit 300 is able to perform calculation processing suitable for the power supply apparatus 200 by receiving data from the nonvolatile memory 301 via the second communication unit. Further, the calculation circuit 300 performs data communication with the CPU 203 to output information about a calculation result of the calculation circuit 300. Instead of performing data communication, the calculation circuit 300 may communicate with the CPU 203 in such a manner that a function of outputting an analog waveform with use of a digital-to-analog (DA) converter is provided. The calculation circuit 300 and the nonvolatile memory 301 will be described in detail below with reference to FIG. 3.

The following describes a protection circuit for the image heating apparatus 50. A relay RL1 is a circuit for protecting the image heating apparatus 50 and interrupts power to the image heating apparatus 50. For example, when the thermistor TH1 detects a temperature (TH signal) which is equal to or higher than a predetermined temperature because of a failure of the power supply apparatus 200, for example, due to a short-circuit of the triac Q5, the relay RL1 is turned OFF. With such operations, the power supply to the image heating apparatus 50 can be interrupted. As described below with reference to FIG. 3, when the calculation circuit 300 determines that a protection operation (an operation for turning the relay RL1 OFF) is to be used, the calculation circuit 300 outputs an OFF signal from the SafeOut terminal. In the present exemplary embodiment, the calculation circuit 300 sets the SafeOut terminal to the low state in the normal state and sets the SafeOut terminal to the high state when the protection operation is used. In a state where the SafeOut terminal outputs the OFF signal for the protection operation, the power supply apparatus 200 turns the relay RL1 OFF. Thus, the calculation circuit 300 is used as a protection circuit for the image heating apparatus 50.

Figure 3:
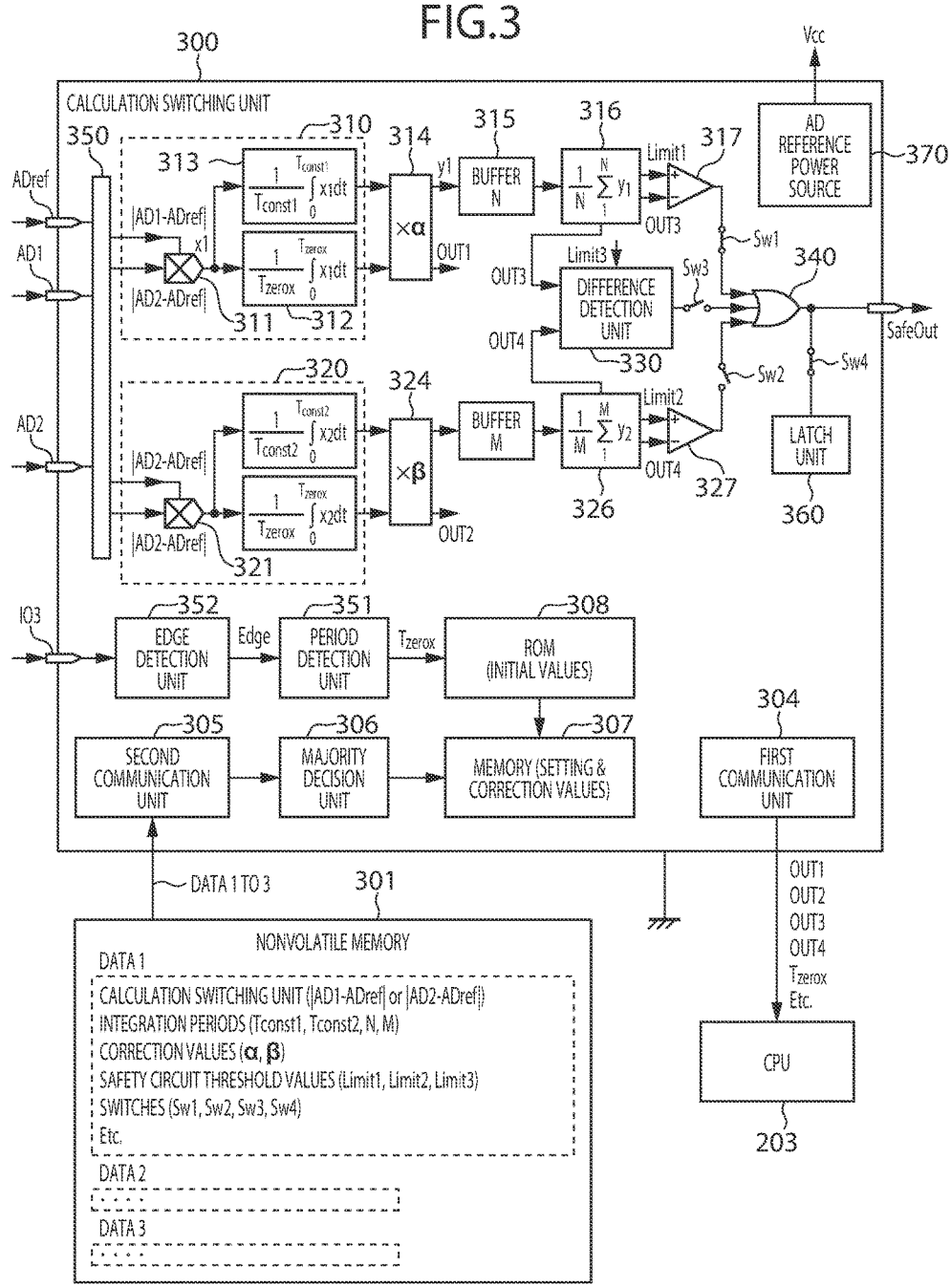
FIG. 3 is a diagram illustrating a calculation circuit according to an aspect of the first exemplary embodiment.

FIG. 3 is a block diagram illustrating functions of the calculation circuit 300 for calculating the effective current value, the effective voltage value, and the power value to be supplied to the image heating apparatus 50. These values are used for controlling of the image heating apparatus 50 mounted on the image forming apparatus 100 or for using the calculation circuit 300 as a protection circuit for the image heating apparatus 50. In the present exemplary embodiment, the calculation circuit 300 is an integrated circuit (IC) integrally formed with a semiconductor integrated circuit.

In the present exemplary embodiment, a method in which a calculation unit 310 calculates power (current times voltage) to be supplied to the image heating apparatus 50 and a calculation unit 320 calculates the effective voltage value (voltage times voltage) of the AC power source 201 will be described below. In the nonvolatile memory 301, setting information and correction information of the calculation circuit 300 (described below) are stored in each of three different memory areas as data 1, data 2, and data 3 in a duplicated way. The calculation circuit 300 receives (being input) the data 1, the data 2, and the data 3 stored in the nonvolatile memory 301 via a second communication unit 305. The CPU 203 determines, under control of a majority decision unit 306 (described below with reference to FIG. 4), whether to use the setting information and the correction information of the calculation circuit 300 acquired by the second communication unit 305 as data of a memory 307 for determining setting and correction values of the calculation circuit 300 for updating the input data 1, the data 2, and the data 3. According to control of the majority decision unit 306 (described below), even if data communication fails or data in the nonvolatile memory 301 is partially destroyed, the operation of the calculation circuit 300 can be normally continued. Thus, the reliability of the calculation circuit 300 can be improved.

When the calculation circuit 300 is activated, the CPU 203 writes in a memory 307 initial setting values prestored in a ROM 308, as the setting and correction values of the calculation circuit 300. Therefore, when the calculation circuit 300 is activated, there arises a state where the initial setting values in the ROM 308 are stored in the memory 307 and the calculation processing of the calculation circuit 300 is performed although there is no data with which majority decision is applicable. At least one of the initial setting values in the ROM 308 is set so that a signal from the SafeOut terminal outputs easier than a case with the setting values in the nonvolatile memory 301 (high state according to the present exemplary embodiment). For example, Limit1, Limit2, and Limit3 (described below), which are to be used as threshold values for changing the signal from the SafeOut terminal to high, are stored in the ROM 308 and are threshold values lower than the setting values in the nonvolatile memory 301. For example, there may arise a state where the nonvolatile memory 301 is not connected with the calculation circuit 300 and a state where data in the nonvolatile memory 301 becomes erroneous because of the life of the nonvolatile memory 301. In such a state, Even if majority decision is not applicable by the majority decision unit 306, it is possible to maintain safety of the image heating apparatus 50 to improve the reliability of the calculation circuit 300.

At least two pieces of duplicated data are used as a plurality of setting information to be stored in the nonvolatile memory 301 which is referred to by the majority decision unit 306. For example, when there are two pieces of duplicated data, the memory 307 is to be updated only when values of the data 1 and 2 are matched. Likewise, for example, when there are five pieces of duplicated data, the most matched data is to be used to update the memory 307. As a method other than majority decision, data may be written in the memory 307, for example, only when at least three of five pieces of duplicated data are matched. With such control of the majority decision unit 306, the reliability against noise malfunctioning of the calculation circuit 300 can be improved. Therefore, malfunctions of the calculation circuit 300 can be prevented even if communication is affected by noise in a configuration in which the calculation circuit 300 communicates with the nonvolatile memory 301 provided outside the calculation circuit 300 as in the present exemplary embodiment.

According to the present exemplary embodiment, the nonvolatile memory 301 is disposed outside the semiconductor integrated circuit of the calculation circuit 300. With this configuration, a semiconductor manufacturing process for mounting a FRASH memory and FRAM (registered trademark) used as a nonvolatile memory in the integrated circuit can be eliminated. Thus, an effect can be obtained in cost reduction in manufacturing of a semiconductor integrated circuit. The nonvolatile memory 301 may be provided outside and shared with circuits other than the calculation circuit 300. The nonvolatile memory 301 may be integrally formed with the semiconductor integrated circuit of the calculation circuit 300.

The first communication unit 304 is used for transmitting (outputting) the calculation result of the calculation circuit 300 to the CPU 203. The first communication unit 304 and the second communication unit 305 are provided as physically different communication lines (for example, bus communication lines) so that communication by the second communication unit 305 can be normally performed between the calculation circuit 300 and the nonvolatile memory 301, even in the case of loss of control of the software of the CPU 203. Further, with this configuration, data in the nonvolatile memory 301 can be prevented from being overwritten to wrong data by the CPU 203. Thus, even if the CPU 203 malfunctions, the calculation circuit 300 can be used as a protection circuit for the image heating apparatus 50. The reliability of the power supply apparatus 200 can be therefore improved.

The following describes the calculation method performed by the calculation circuit 300. A calculation switching unit 350 selectively inputs data to the calculation units 310 and 320 based on the setting information stored in the memory 307. Each of the calculation unit 310 and 320 can selectively switch a signal between two signals. More specifically, selection can be made from "|AD1−ADref|" which is an absolute value of a difference between sampling results of the AD converter AD1 and the AD converter ADref (hereinafter referred to as a current sampling value) and "|AD2−ADref|" which is an absolute value of a difference between sampling results of the AD converter AD2 and the AD converter ADref (hereinafter referred to as a voltage sampling value) can be selected. The AD converter AD2 and the AD converter ADref convert an analog input signal into digital data using an AD reference power source 370 as a reference voltage of AD conversion.

With the function of the calculation switching unit 350, the calculation contents can be flexibly changed according to the specifications of the power supply apparatus 200. For example, if three different calculation units are provided in the calculation circuit 300 to enable the calculation circuit 300 to calculate the effective current value, the effective voltage value, and the power value, the circuit scale of the calculation circuit 300 increases thereby resulting in a cost increase. With a circuit which is capable of calculating only any two of the effective current value, the effective voltage value, and the power value without switching the calculation contents using the nonvolatile memory 301, flexibility, making the calculation circuit 300 applicable to diverse types of power supply apparatuses is decreased. As in the present exemplary embodiment, if the setting information of the calculation switching unit 350 is stored in the nonvolatile memory 301 and the setting information is changed for the calculations according to the circuit configuration of the power supply apparatus 200, both low cost in manufacturing and flexibility of the calculation circuit 300 can be achieved.

In the calculation circuit 300, based on the Zerox signal detected at the IO3 terminal, an edge detection unit 352 detects a half period timing of the AC voltage from the AC power source 201 (zero-crossing timing of the AC voltage) and outputs an edge signal. Based on the edge signal, a period detection unit 351 detects a Tzerox signal equivalent to the half period of the AC power source 201. The edge detection unit 352 outputs the edge signal for each half period of the AC power source 201 to enable calculation to be performed for each half period of the AC power source 201. The edge detection unit 352 may output the edge signal for each multiple of the half period of the AC voltage from the AC power source 201.

The following describes the calculation unit 310. Based on the setting information stored in the memory 307, the calculation unit 310 inputs the current sampling value and the voltage sampling value and performs power calculation (current times voltage). The calculation result x1 of a multiplication unit 311 is output to an integration unit 312 used for calculations for each half-wave of the AC power source 201 and an integration unit 313 used for calculations for the OFF signal output.

In synchronization with the edge signal output for each half period of the AC voltage detected by the edge detection unit 352, the integration unit 312 calculates the integration of the calculation result x1 of the multiplication unit 311 for each period of the Tzerox signal equivalent to the half period of the zero-crossing detected by the period detection unit 351. The integration unit 311 is characterized in performing the integration in synchronization with the Zerox signal of the AC power source 201. The integration unit 313 calculates the integration of the calculation result x1 of the multiplication unit 311 during a predetermined integration period Tconst1 set by the nonvolatile memory 301. With the predetermined integration period Tconst1, the integration value for each predetermined period can be calculated without being affected by the period of the AC voltage from the AC power source 201. The predetermined period can be flexibly set by setting information to the nonvolatile memory 301 and can be, for example, set for each period of the AC voltage, set for each half period of the AC voltage.

The output of the integration unit 313 is used for control of the SafeOut signal output from the calculation circuit 300, which is effective since the response speed of the output is not affected by the period of the AC voltage from the AC power source 201. For example, if the SafeOut signal output is controlled using the output of the integration unit 312 with the 50 Hz and 60 Hz frequencies of the AC voltage from the AC power source 201, the response time of the SafeOut signal of the calculation circuit 300 is affected by 20% and varied. A correction unit 314 is used for correcting the accuracy of the output from the calculation unit 310. For example, by storing an adjustment value α in the nonvolatile memory 301 at the time of shipment inspection of the power supply apparatus 200, it becomes possible to correct variations of circuits, such as the transformers CT1 and CT2 and improve the calculation accuracy of the calculation circuit 300. The correction unit 314 corrects the output of the integration unit 312 and outputs a calculation result OUT1 to the CPU 203 via the first communication unit 304.

The correction unit 314 also corrects the output of the integration unit 313 and outputs a calculation result y1. Calculation results y1 for the last N calculations are stored in a buffer 315 based on the setting information for the buffering count N stored in the memory 307. A moving average calculation unit 316 calculates the sum total of the calculation results y1 for the last N calculations stored in the buffer 315 and outputs a moving average value OUT3, of power supplied to the image heating apparatus 50, determined by the integration period Tconst1 and the buffering count N. Then, the moving average calculation unit 316 outputs the calculated moving average value OUT3 to the CPU 203 via a comparison unit 317, a difference detection unit 330, and the first communication unit 304. The comparison unit 317 compares the moving average value OUT3 with an upper limit Limit1 stored in the memory 307. In a case where the moving average value OUT3 exceeds the upper limit Limit1, the output of the comparison unit 317 becomes High.

A switch Sw1 is used for enabling or disabling the output of the comparison unit 317. More specifically, the switch Sw1 enables or disables the output to a logical sum unit 340, based on a setting stored in the memory 307. When any one of the outputs of the comparison unit 317, a comparison unit 327 (described below), and the difference detection unit 330 which correspond enabled switches Sw1, Sw2, and Sw3, respectively, becomes High, the logical sum unit 340 sets the SafeOut signal to High. In the present exemplary embodiment, only the switch Sw1 for the comparison unit 317 is enabled.

The following describes a latch unit 360 for the SafeOut signal. When the SafeOut signal becomes High for a predetermined time period, the latch unit 360 as a latch circuit latches the SafeOut signal in the High state. A switch Sw4 is used for enabling or disabling the latch unit 360. More specifically, the switch Sw4 enables or disables the latch unit 360 based on a setting stored in the memory 307. In the present exemplary embodiment, the switch Sw4 of the latch unit 360 is enabled.

The operation of the calculation unit 320 is similar to that of the calculation unit 310, and redundant descriptions thereof will be omitted. In the calculation unit 320, a sampling voltage value is input to both of the two input signals of a multiplication unit 321. The calculation unit 320 calculates the effective voltage value (voltage times voltage). A correction unit 324 corrects an output of the calculation unit 320 using an adjustment value β and outputs a calculation result OUT2 to the CPU 203 via the first communication unit 304. A moving average calculation unit 326 outputs a calculated moving average value OUT4 to the CPU 203 via the comparison unit 327, the difference detection unit 330, and the first communication unit 304. The switch Sw2 disables the output from the comparison unit 327 to the logical sum unit 340, based on a setting stored in the memory 307.

The difference detection unit 330 compares an absolute value of a difference between the moving average values OUT3 and OUT4 with the upper limit Limit3 stored in the memory 307. In a case where the absolute value exceeds the upper limit Limit3, the output of the difference detection unit 330 is set to High. The switch Sw3 disables the output from the difference detection unit 330 to the logical sum unit 340, based on a setting stored in the memory 307. In control of a heater having a plurality of heat generating resistors to which power can be independently supplied, for example, the difference detection unit 330 can be used as a means for operating the protection circuit when the difference between currents flowing in the heat generating resistors increases. The difference detection unit 330 may be set to change its output to High only in a case where a value obtained by subtracting the moving average value OUT4 from the moving average value OUT3 exceeds the upper limit Limit3, based on information stored in the memory 307. The difference detection unit 330 also may be set to change its output to High only in a case where a value obtained by subtracting the moving average value OUT3 from the moving average value OUT4 exceeds the upper limit Limit3, based on information stored in the memory 307.

Figure 4:
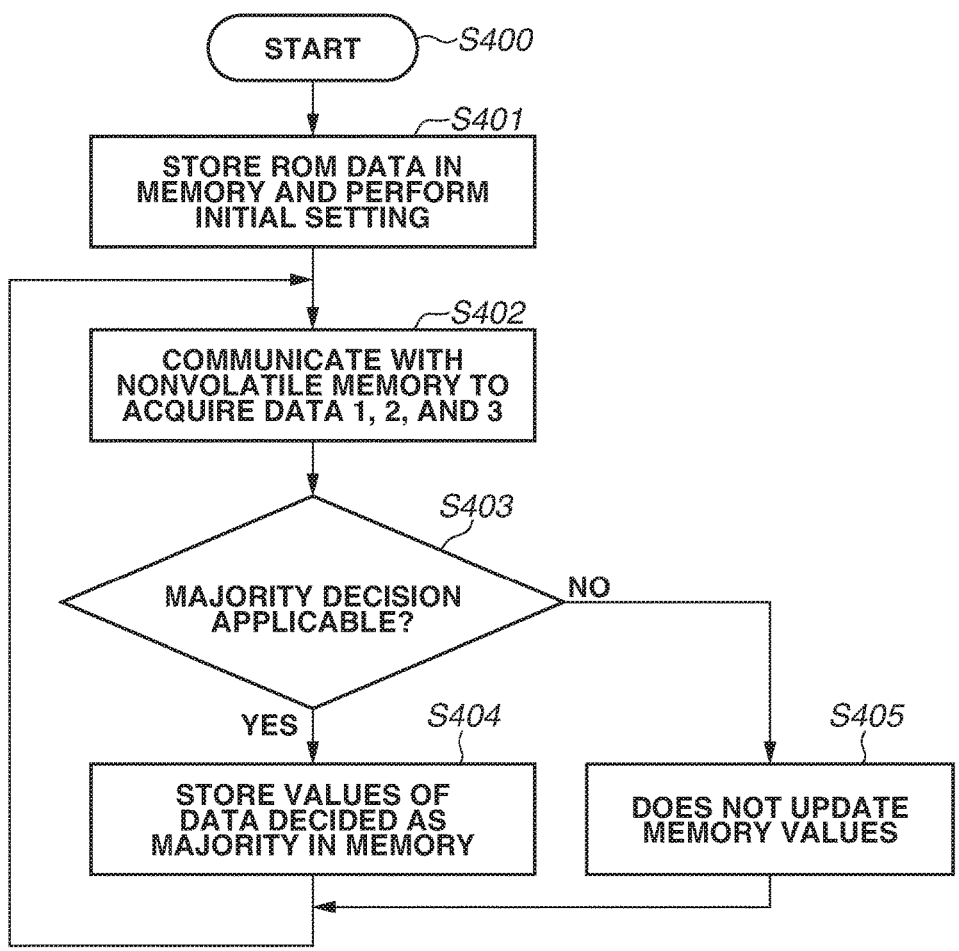
FIG. 4 is a flowchart illustrating communication between the calculation circuit and a nonvolatile memory according to an aspect of the first exemplary embodiment.

FIG. 4 is a flowchart illustrating a sequence related to the communication with the nonvolatile memory 301 and the determination by the majority decision unit 306 performed by the calculation circuit 300 according to the present exemplary embodiment. In step S400, when the power voltage Vcc of the calculation circuit 300 is supplied, the CPU 203 starts control. In step S401, the CPU 203 stores in the memory 307 the initial setting values stored in the ROM 308 to perform an initial setting of the calculation circuit 300, and the processing proceeds to step S402.

In step S402, the CPU 203 communicates with the nonvolatile memory 301 to acquire the data 1 to 3, and the processing proceeds to step S403. In step S403, the CPU 203 determines whether at least two of the data 1 to 3 are matched for each setting value. In a case where the majority decision unit 306 determines that majority decision is applicable (at least two of the data 1 to 3 are matched) (YES in step S403), the processing proceeds to step S404. On the other hand, when the majority decision unit 306 determines that majority decision is not applicable (all of the data 1 to 3 are different) (NO in step S403), the processing proceeds to step S405. In step S404, the CPU 203 employs the data decided as majority in step S403 as setting values of the calculation circuit 300 and updates the setting values in the memory 307. In step S405, since majority decision is not applicable, the CPU 203 does not update the setting values in the memory 307 (leaves the initial setting values unchanged). Upon completion of the processing in steps S404 or S405, the processing returns to step S402. Then, the CPU 203 repetitively performs control processing in steps S402 to S405 to continuously update the setting values of the calculation circuit 300.

In the present exemplary embodiment, the CPU 203 stores the following information in the nonvolatile memory 301 as setting values of the calculation circuit 300:
  calculation data of the calculation units 310 and 320,
  |AD1−ADref| or |AD2−ADref| as operation of the calculation switching unit 350,
  correction values α and β,
  integration periods Tconst1 and Tconst2,
  buffering counts N and M,
  upper limits Limit1, Limit2, and Limit3, and
  information indicating enabled/disabled states of switches Sw1 to Sw4.

As the initial setting values in the ROM 308, in comparison with the setting values in the nonvolatile memory 301, the following values are set in the relative manner as follows:
  correction values α and β (initial setting values) which are larger than those in the nonvolatile memory 301,
  integration periods Tconst1 and Tconst2 (initial setting values) which are shorter than those in the nonvolatile memory 301,
  buffering counts N and M (initial setting values) which are smaller than those in the nonvolatile memory 301,
  upper limits Limit1 to Limit3 (initial setting values) which are lower than those in the nonvolatile memory 301, and
  switches Sw1 to Sw4 (initial setting values) which are all enabled.

As described above, in one embodiment, at least one initial setting value in the ROM 308 is set so that outputting the OFF signal from the SafeOut terminal is easier than a case with the setting values in the nonvolatile memory 301.

Features (effects) of the above-described calculation circuit 300 provided to the power supply apparatus 200 according to the present exemplary embodiment are as follows.
  Even with a small number of calculation circuits, the calculation contents of the calculation circuit 300 can be changed using the nonvolatile memory 301 whereby both flexibility and low cost can be achieved.
  The second communication unit 305 dedicated to the communication (data reception) between the calculation circuit 300 and the nonvolatile memory 301 is provided whereby the calculation circuit 300 can be used as a protection circuit for the image heating apparatus 50 without being affected by loss of control (abnormal state) of the software of the CPU 203.
  With the initial setting values in the ROM 308, safety of the image heating apparatus 50 can be maintained even if a failure of the nonvolatile memory 301 or a communication failure occurs.
  With the control of the majority decision unit 306, the calculation circuit 300 has immunity to noise and malfunctioning whereby having high reliability.
  The nonvolatile memory 301 can be easily attached externally to the calculation circuit 300. In a case where the calculation circuit 300 is integrally formed as a semiconductor integrated circuit, manufacturing processes for FLASH memory, ferroelectric random access memory (FRAM) (registered trademark), etc. become unnecessary, whereby cost of the calculation circuit 300 can be reduced.

As described above, according to the configuration according to the present exemplary embodiment, a low-cost calculation circuit, which is used for control of an image heating apparatus or is used as a protection circuit for the image heating apparatus, having high detection accuracy, high reliability, and high flexibility can be provided.

Figure 5:
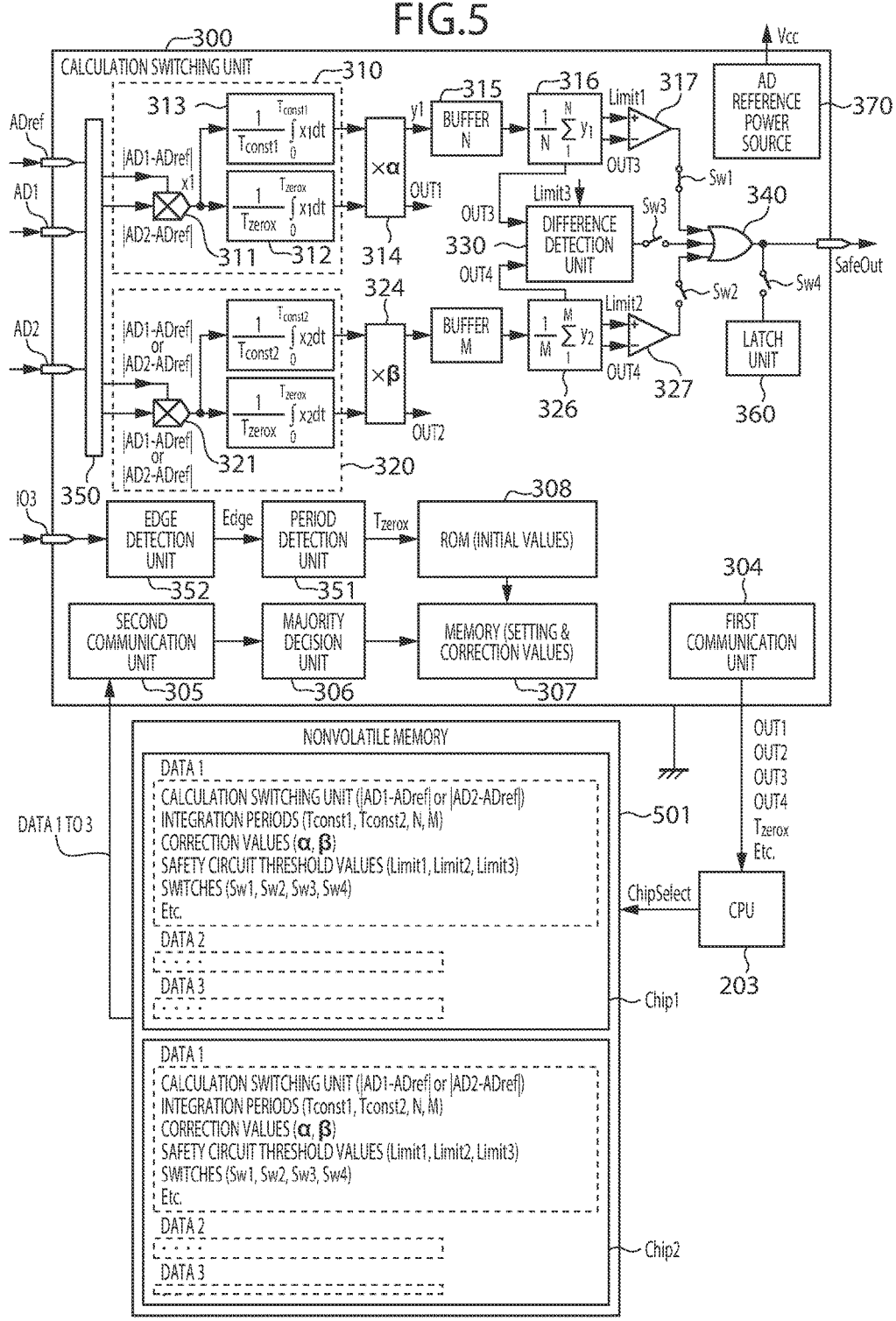
FIG. 5 is a diagram illustrating a calculation circuit according to an aspect of a second exemplary embodiment.

An example of an application of the calculation circuit 300 according to a second exemplary embodiment will be described below with reference to FIG. 5. In FIG. 5, elements similar to those of the first exemplary embodiment are assigned the same reference numeral, and redundant descriptions thereof will be omitted. The configuration to which the calculation circuit 300 illustrated in FIG. 5 is applicable differs from the application method illustrated in FIG. 3 in that a memory chip of a nonvolatile memory 501 which communicates with the calculation circuit 300 can be changed by using a ChipSelect signal of the CPU 203.

With settings of a memory chip Chip1 of the nonvolatile memory 501, the calculation unit 310 calculates power (current times voltage) to be supplied to the image heating apparatus 50, and the calculation unit 320 calculates the effective voltage value (voltage times voltage) of the AC power source 201. With settings of a memory chip Chip2 of the nonvolatile memory 501, the calculation unit 310 calculates power (current times voltage) to be supplied to the image heating apparatus 50, and the calculation unit 320 calculates the effective current value (current times current) to be supplied to the image heating apparatus 50. The CPU 203 selects a memory chip, of the nonvolatile memory 501, which communicates with the calculation circuit 300 so that calculation contents of the calculation circuit 300 can be switched at an arbitrary timing. Thus, the power value, the effective current value, and the effective voltage value can be detected. Therefore, three different calculation results can be obtained using the two calculation units 310 and 320 of the calculation circuit 300.

Since the switch Sw1 is enabled, the CPU 203 controls the SafeOut signal of the calculation circuit 300, based on the power calculation result of the calculation unit 310. According to the present exemplary embodiment, the switch Sw4 of the latch unit 360 is disabled. For the power calculation of the calculation unit 310, similar setting and correction values are stored in the memory chips Chip1 and Chip2 of the nonvolatile memory 501. Therefore, the calculation circuit 300 is able to maintain the function as a protection circuit for the image heating apparatus 50 regardless of the state of the CPU 203 (state of the ChipSelect signal).

For example, in a case where the CPU 203 switches the calculation contents of the calculation circuit 300 by directly communicating with the second communication unit 305 of the calculation circuit 300, it is difficult to maintain the function as a protection circuit for the image heating apparatus 50 if a loss of control of the software of the CPU 203 occurs. In such a case, the method for switching the calculation contents according to the present exemplary embodiment is effective. In the present exemplary embodiment, the CPU 203 switches the calculation contents of the calculation circuit 300 by selecting the memory chip in the nonvolatile memory 501 which communicates with the calculation circuit 300. However, the configuration is not limited thereto. For example, a plurality of nonvolatile memories may be provided and a nonvolatile memory to be connected to the calculation circuit 300 may be physically switched.

Even if the calculation switching unit 350 of the calculation circuit 300 is set in such a manner that only the calculation contents of the calculation unit 320 can be switched and the calculation contents of the calculation unit 310 cannot not be switched, the power value, the effective current value, and the effective voltage value can be detected. The calculation circuit 300 is characterized in that the calculation contents of at least one calculation unit can be switched.

The application method of the calculation circuit 300 according to the present exemplary embodiment has the following features (effects) in addition to the features (effects) of the first exemplary embodiment.

Three different calculation results can be obtained by two different calculation units.

The function as a protection circuit can be maintained even after switching of the calculation contents of the calculation circuit 300.

As described above, with the configuration according to the present exemplary embodiment, a low-cost calculation circuit, which is used for control of an image heating apparatus or is used as a protection circuit for the image heating apparatus, having high detection accuracy, high reliability, and high flexibility can be provided.

Figure 6:
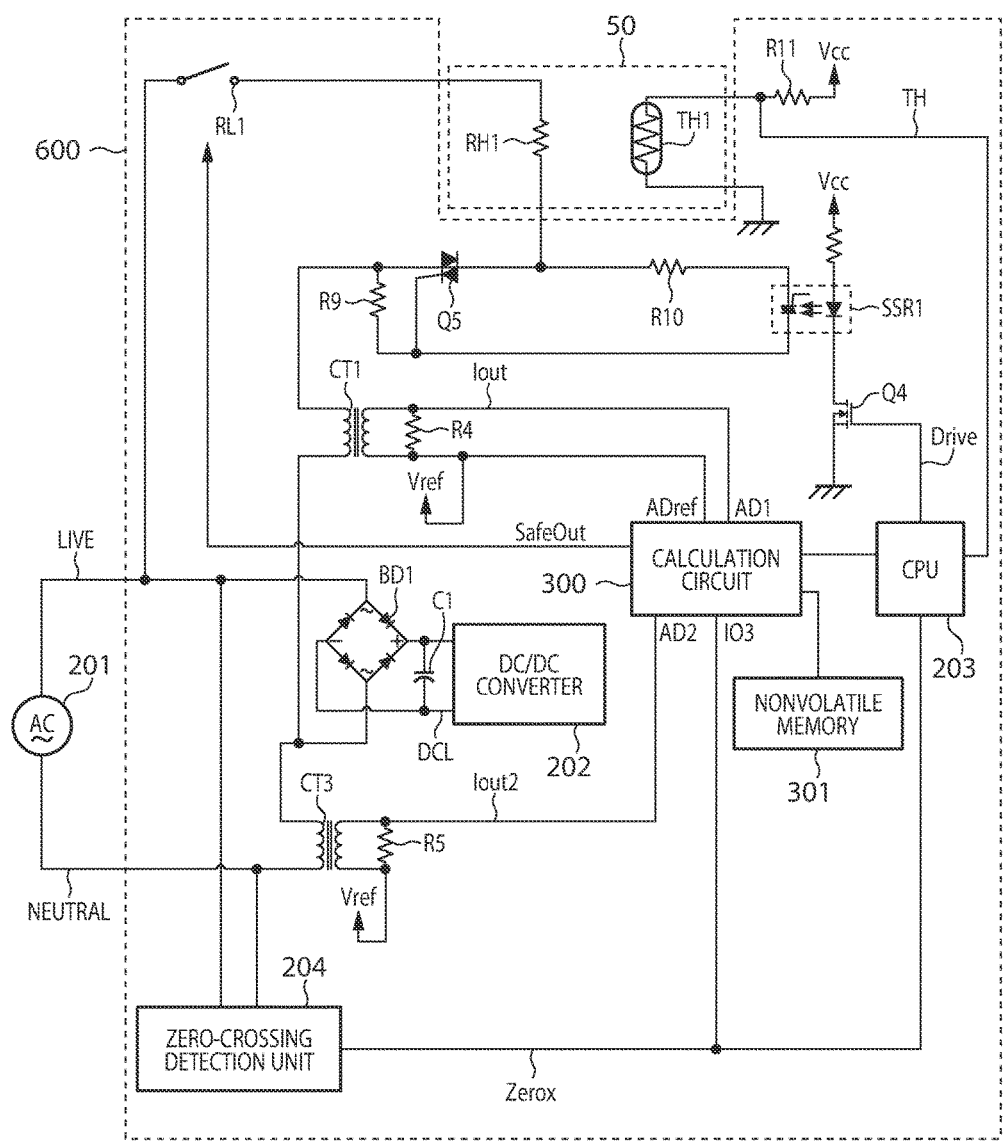
FIG. 6 is a diagram illustrating a power supply apparatus according to an aspect of a third exemplary embodiment.

A power supply apparatus 600 to which the calculation circuit 300 according to a third exemplary embodiment is applicable will be described below with reference to FIG. 6. In FIG. 6, elements similar to those of the first exemplary embodiment are assigned the same reference numeral, and redundant descriptions thereof will be omitted. The power supply apparatus 600 illustrated in FIG. 6 includes a detection transformer CT3 for detecting a current which is supplied from the AC power source 201 to the power supply apparatus 600, and a detection transformer CT1 for detecting a current which is supplied to the image heating apparatus 50.

The following describes a method of detecting the current supplied from the AC power source 201 using the transformer CT3 of the power supply apparatus 600. The current which is supplied to the power supply apparatus 600 flows into the primary side of the detection transformer CT3. On the secondary side of the detection transformer CT3, a current proportional to the primary side is generated, and a voltage Iout2 generated in a damping resistor R5 and a predetermined reference voltage Vref are input to the calculation circuit 300. The calculation circuit 300 detects a current value flowing in the power supply apparatus 600, based on a difference value between the output voltage Iout2 of the detection transformer CT3 and the reference voltage Vref. The detection transformer CT3 is used whereby the total current flow in the power supply apparatus 600 (image forming apparatus 100) can be detected. Therefore, control can be performed such that the current flowing from the AC power source 201 to the image forming apparatus 100 does not exceed a predetermined regulated effective current value which is set on a legal basis.

When the calculation circuit 300 is applied to the power supply apparatus 600, the calculation unit 310 calculates the effective current value (current times current) to be supplied to the image heating apparatus 50, and the calculation unit 320 detects the effective current value (current times current) supplied from the AC power source 201 to the power supply apparatus 600. Based on the calculation result of the calculation unit 310, the calculation circuit 300 outputs the SafeOut signal in a case where the moving average value of the effective value of the current which is supplied to the image heating apparatus 50 exceeds a predetermined upper limit Limit1 (Sw1=ON, Sw2=OFF, and Sw3=OFF).

According to the present exemplary embodiment, with the setting of the nonvolatile memory 501, it is indicated that the calculation circuit 300 is applicable to diverse types of power supply apparatuses. Since the calculation circuit 300 has high flexibility, it is not necessary to provide a calculation circuit for each power supply apparatus. Therefore, manufacturing cost of a power supply apparatus can be reduced.

Although, in the above-described exemplary embodiment, the present invention is applied to the power supply apparatus for supplying power to the image heating apparatus of the image forming apparatus, an apparatus to which aspect of the embodiments is applicable is not limited thereto. The aspect of the embodiment is also applicable to an apparatus capable of calculating information, such as the power values and the effective current value to control operations.

While aspect of the embodiments has been described with reference to exemplary embodiments, it is to be understood that aspect of the embodiments is not limited to the disclosed exemplary embodiments. The scope of the following claims is to be accorded the broadest interpretation so as to encompass all such modifications and equivalent structures and functions.

This application claims the benefit of Japanese Patent Application No. 2015-214975, filed Oct. 30, 2015, which is hereby incorporated by reference herein in its entirety.

What is claimed is:

1. An apparatus comprising:
   a calculation unit configured to calculate information about power using a first signal related to a current and a second signal related to a voltage;
   a first communication unit configured to transmit a calculation result of the calculation unit;
   a second communication unit configured to receive a plurality of pieces of setting information stored in a storage unit; and
   a switching unit configured to switch calculation processing of the calculation unit, based on the plurality of pieces of the setting information received via the second communication unit;
   wherein the calculation unit calculates an effective voltage value or an effective current value by selectively using the first and the second signals based on the information stored in the storage unit.

2. The apparatus according to claim 1, wherein the calculation unit includes a multiplication unit and an integration unit for integrating outputs of the multiplication unit,
   wherein the calculation unit includes a plurality of calculation parts, and
   wherein the calculation unit transmits a calculation result of at least one of a plurality of the calculation parts is transmitted via the first communication unit, based on the plurality of pieces of setting information received via the second communication unit.

3. The apparatus according to claim 1, further comprising a correction unit configured to correct the calculation result of the calculation unit, based on the plurality of pieces of setting information received via the second communication unit.

4. The apparatus according to claim 1, wherein in a case where the calculation result of the calculation unit exceeds a threshold value, the calculation unit outputs an OFF signal and sets the threshold value based on the plurality of pieces of setting information received via the second communication unit.

5. The apparatus according to claim 4, wherein the calculation unit includes initial setting values for calculation processing of the calculation unit, and
   wherein the threshold value in the initial setting values is smaller than the threshold value in the plurality of pieces of setting information.

6. The apparatus according to claim 1, further comprising:
a detection unit configured to detect a zero-crossing timing of an AC voltage,
wherein the calculation unit includes a first integration unit and a second integration unit,
wherein the first integration unit calculates an integration value for each period or each half-period of the AC voltage in synchronization with the zero-crossing timing of the AC voltage, and
wherein the second integration unit calculates an integration value for each predetermined period set based on the plurality of pieces of setting information and, in a case where an output of the second integration unit exceeds a predetermined threshold value, outputs an OFF signal.

7. The apparatus according to claim 1, further comprising a majority decision unit configured to perform majority decision for the plurality of pieces of the setting information received via the second communication unit,
wherein in a case where the majority decision is applicable to the plurality of pieces of setting information, the plurality of pieces of setting information is used as setting information for the calculation unit.

8. The apparatus according to claim 1, further comprising:
a plurality of storage units each configured to store the plurality of pieces of the setting information,
wherein the calculation unit receives the plurality of pieces of setting information is received by selecting a storage unit from among a plurality of the storage units.

9. A fixing apparatus for fixing an image on a recording material, the fixing apparatus comprising:
a heater configured to heat the recording material on which the image is formed;
a calculation unit configured to calculate information about power using a first signal related to a current and a second signal related to a voltage;
a first communication unit configured to transmit a calculation result of the calculation unit;
a second communication unit configured to receive a plurality of pieces of setting information stored in a storage unit;
a switching unit configured to switch calculation processing of the calculation unit, based on the plurality of pieces the setting information received via the second communication unit; and
a control unit configured to control power to be supplied to the heater according to information transmitted from the first communication unit,
wherein the calculation unit calculates an effective voltage value or an effective current value by selectively using the first and the second signals based on the information stored in the storage unit, and
wherein the control unit transmits any one of the power, the effective voltage value, and the effective current value via the first communication unit.

10. An image forming apparatus for forming an image on a recording material, the image forming apparatus comprising:
an image forming unit configured to form an image on a recording material;
a heater configured to heat a recording material on which an image is formed;
a calculation unit configured to calculate information about power using a first signal related to a current and a second signal related to a voltage;
a first communication unit configured to transmit a calculation result of the calculation unit;
a second communication unit configured to receive a plurality of pieces of setting information stored in a storage unit;
a switching unit configured to switch calculation processing of the calculation unit, based on the plurality of pieces of the setting information received via the second communication unit; and
a control unit configured to control power to be supplied to the heater according to information transmitted from the first communication unit,
wherein the calculation unit calculates an effective voltage value or an effective current value by selectively using the first and the second signals based on the information stored in the storage unit, and
wherein the control unit transmits any one of the power, the effective voltage value, and the effective current value via the first communication unit.

11. The image forming apparatus according to claim 10, further comprising:
a film configured to hold the heater, and
a pressing member configured to contact the film to form a nip portion,
wherein the image forming apparatus conveys a recording material to the nip portion and fixes an image onto the recording material.

12. The image forming apparatus according to claim 10, further comprising a transfer unit configured to transfer an image formed on an image bearing member onto a recording material.

* * * * *